United States Patent [19]  
Hussey

[11] B 4,001,124  
[45] Jan. 4, 1977

[54] LONG-WEARING PLASTIC BEARINGS

[75] Inventor: Eugene H. Hussey, Temple, Pa.

[73] Assignee: The Polymer Corporation, Reading, Pa.

[22] Filed: Mar. 17, 1975

[21] Appl. No.: 559,142

[44] Published under the second Trial Voluntary Protest Program on March 2, 1976 as document No. B 559,142.

[52] U.S. Cl. .............................................. 252/12  
[51] Int. Cl.² .................... C10M 5/00; C10M 7/00  
[58] Field of Search ................ 252/12, 12.2, 12.4, 252/12.6

[56] References Cited  
UNITED STATES PATENTS 3,852,203 12/1974 Morisaki .............................. 252/12  
3,896,036 7/1975 Cairns ................................. 252/12

Primary Examiner—Delbert E. Gantz  
Assistant Examiner—I. Vaughn  
Attorney, Agent, or Firm—Synnestvedt & Lechner

[57] ABSTRACT

An improved plastic bearing composition for use in sliding contact with metals is disclosed in which one component is selected for its facility to coat the metal bearing surface, a second component is selected for its chemical inertness, and a third component is selected as a carrier material for the second chemically inert component.

4 Claims, No Drawings

LONG-WEARING PLASTIC BEARINGS

DESCRIPTION OF THE PRIOR ART

Plastic materials have been used for a considerable period of time in various bearing applications in which metal and plastic are engaged in sliding contact with each other. Historically, in the selection of the plastic materials, such properties as low coefficient of friction, resistance to wear, and ability to withstand high PV loadings have formed the criteria for the selection of the materials. (By "PV loading" is meant the product of the force on the bearing in pounds per square inch multiplied by the relative velocity of the sliding components in feet per minute.) These criteria, by and large, have not proven to be reliable in predicting the operability of a plastic bearing and the success or failure of the plastic bearing has generally been determined on a purely pragmatic basis.

OBJECTS OF THE INVENTION

It is the object of this invention to improve the predictability of the utility of a plastic bearing under varying conditions.

Another object of this invention is to provide particular bearing materials which have decreased wear and increased total lifetime.

The invention is based upon the discovery that the wear life of plastic running against metal is the result of a plurality of phenomenological occurrences which, when isolated, can be optimized to provide low wear rates and high bearing lifetimes.

The first phenomenological property that forms the basis of this invention lies in the fact that wear rate and degradation of a plastic bearing material is at a maximum when there is relative sliding motion between the plastic and the metal. When this sliding contact exists, the metal is subject to deformation and provides sites where corrosive and generally chemically degraded plastic may form. The degradation of the plastic may be due to such things as oxidation, hydrolyzation, and carbonization and the like.

Accordingly, to minimize this initial deformation of the metal and degradation of the plastic, it is important to inhibit sliding contact between the plastic and the metal at the earliest possible time. It is known that various plastics will adhere to metal much more rapidly than other plastic materials, thus making it possible to minimize the period of time in which the plastic and the metal are in sliding contact with each other. For convenience herein, the period of time required for the plastic to adhere in nonsliding relationship to the metal will be referred to as the "exchange time."

The second phenomenological effect that has been observed is that plastic bearings fail by products of degradation reaching the metal interface. It is, of course, obvious that the rate of degradation is influenced by the temperature of the bearing, but this may be compensated, at least in part, by selecting as the bearing material a substance which is relatively inert to oxidation, hydrolysis, and other chemical attack, particularly at elevated temperatures.

In studies which have been made utilizing various materials as plastic bearings, no single plastic has been found that combines properties of low exchange time and high chemical resistance. This has led to the discovery that by the proper selection and combination of several different polymeric materials, a certain synergism can be developed in which the exchange time can be minimized and the chemical resistance maximized.

It has been found that polyolefins, as a class, have minimum exchange times. This is particularly true with respect to polyethylene and, to a lesser extent, to polypropylene and polybutylene. Since these materials have low exchange times, the sliding friction between the metal and the plastic is minimized when the bearing is run in. The polyolefins, however, under conditions of continued wear, tend to degrade, particularly at higher temperatures, variously by oxidation, hydrolysis or carbonization. For this reason, while they initially are excellent materials due to their low exchange time, they are not satisfactory in making bearings having low wear rates and long lifetimes.

On the other hand, the fluorinated polycarbons, as best exemplified by polytetrafluoroethylene, are quite chemically inert and they are capable of retaining their chemical properties without undue degradation under prolonged periods of time and at moderately elevated temperatures. The fluorinated hydrocarbons, however, have comparatively long exchange times and therefore are not satisfactory materials to use in initially breaking in a bearing due to the fact that sliding contact between the fluorinated hydrocarbons and the metal will take place over an unsatisfactorily long period of time.

The above problems are solved, in accordance with this invention, by including two components within a plastic bearing material. The first of these components is selected for its low exchange time and the second component is selected for its relative chemical inertness. As a further criterion, the second chemically resistant material should have an exchange time of a short enough duration that it is capable of attaching itself to the metal bearing prior to the time that the first material having a low exchange time begins to dissipate. Utilizing the materials that seem to provide optimum properties, polyethylene will have sufficient residual coating on the metal to permit the polytetrafluroethylene to coat the metal prior to the time that the polyethylene is unduly dissipated.

Stated differently, the lifetime of the polyethylene (by "lifetime" is meant the time until destructive degradation takes place) must be sufficient to permit the accumulation of polytetrafluoroethylene on the metal substrate to preserve the lack of sliding contact between plastic and metal to prevent or inhibit chemical degradation of the plastic at the metal interface.

It is therefore proposed that an ideal plastic bearing material will be comprised of a polyolefin to reduce the exchange time to a minimum while retaining a sufficient lifetime to enable the fluorinated hydrocarbon to supplement it as a coating on the metal.

A two-component system such as discussed above will, despite the efforts made to avoid various forms of degradation, have a comparatively poor lifetime. This is due to the fact that the chemically resistant materials, such as the fluorinated polycarbons, are, as a whole, comparatively soft materials that have high creep, that are difficult to contain within the confines of a bearing, and that are subject to excessive abrasive wear. For this reason, it is proposed that a third ingredient be included within the bearing material which is comparatively hard and tough and will act as a carrier to retain the fluorinated hydrocarbon between the bearing surfaces. Ideally, a material of this sort is nylon which has high abrasion resistance, is relatively tough, and will act as a retainer or carrier for the fluorinated hydrocarbon within the confines of the bearing. Nylon is also especially suited for this purpose due to its hardness, its low wear rate, and its crystalline structure. In less rigorous applications, however, other materials, such as polyesters, polycarbonates, polysulfones, and polyacetals, might suffice as the carrier for the polytetrafluoroethylene.

As an example of a preferred composition made in accordance with this invention, the plastic bearing would be comprised of about 5% polyethylene, 10% polytetrafluoroethylene, and the remainder being nylon. While these percentages are not critical and can be modified as required by the conditions of operation, they do possess the advantages of supplying sufficient polyethylene to obtain a short exchange time, sufficient polytetrafluoroethylene to provide chemical resistance, and sufficient nylon to add strength and wear resistance to the bearing.

In the selection of the polyethylene to be used in the bearing, it has been found most effective if it exists in the form of individual particles that are not too finely dispersed or dissolved in the nylon. For this reason, high molecular weight polyethylenes are particularly recommended, i.e., those in the range of from about 800,000 to 8,000,000 molecular weight.

In order to prepare a composition of this sort that has a high degree of homogeneity, it is preferred to use finely divided polytetrafluoroethylene, such as obtained through suspension polymerization. With respect to the nylon, there is no criticality as to the exact nylon used; however, it has been found most advantageous to use a nylon prepared from an anionic lactam polymerization which permits a thixotropic agent to be used to maintain the homogeneity of the various components.

I claim:

1. A plastic bearing material adapted to be used in sliding contact with metal comprised of a minor amount of a polymeric polyolefin material having a low exchange time, minor amount of a relatively chemically inert fluorinated hydrocarbon polymeric material that is capable of replacing or supplementing the low exchange time material at the metal surface, and a comparatively tough, rigid material selected from the group consisting of nylon, polyesters, polycarbonates, polyacetals, and polysulfones that will act as a carrier and retainer for the polymeric material having the relatively high chemical inertness.

2. A plastic bearing material according to claim 1 wherein the polymeric material having a low exchange time is polyethylene.

3. A plastic bearing material according to claim 1 wherein the fluorinated hydrocarbon is polytetrafluoroethylene.

4. A plastic bearing material according to claim 1 wherein the polymeric carrier material is nylon.

* * * * *